Patented Jan. 22, 1952

2,583,519

UNITED STATES PATENT OFFICE 2,583,519

AZO-DYESTUFFS

Max Schmid, Riehen, and Eduard Moser, Basel, Switzerland, assignors to Ciba Limited, Basel, Switzerland, a Swiss firm No Drawing. Application July 20, 1948, Serial No. 39,809. In Switzerland December 19, 1944

6 Claims. (Cl. 260—166)

This application is a continuation in part of our abandoned application Serial No. 635,768, filed December 18, 1945.

The present invention is concerned with new tetrakisazo-dyestuffs of the so-called J-acid (isogamma acid) series. It is an object of the present invention to provide new substantive azo-dyestuffs which are capable of forming complex metal compounds.

J-acid is an old component in azo chemistry. The dyestuffs derived therefrom by effecting at least a coupling reaction ortho to the hydroxyl group all possess the typical configuration

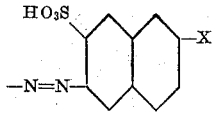

wherein X is a nitrogen-containing substituent with a nitrogen atom directly attached to the ring carbon atom of the naphthalene nucleus. The centrally symmetrical positions of the azo-group (6-position) and the nitrogen atom in 2-position appear to have certain effects on the behavior of the whole group of J-acid dyestuffs.

According to the present invention valuable tetrakisazo-dyestuffs are made by coupling with one molecular proportion of 5:5'-dihydroxy-2:2'-dinaphthylamine-7:7'-disulfonic acid, one molecular proportion of a diazotized monoazo-dyestuff which is free from sulfonic acid groups and corresponds to the formula (I) 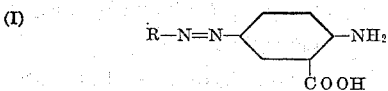

wherein R stands for an aromatic radical of the benzene series which is substituted by a hydroxyl and a carboxyl group in ortho-position to each other, and one molecular proportion of a diazotized monoazo-dyestuff which is free from sulfonic acid groups and corresponds to the formula (II) 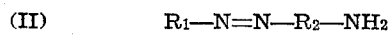 $R_1$—N=N—$R_2$—$NH_2$ wherein $R_1$ stands for an aromatic radical of the benzene series which is substituted by a hydroxyl and a carboxyl group in ortho position to each other, and $R_2$ stands for an aromatic radical of the benzene series in which the groups —N=N— and —$NH_2$ are in para-position to each other and which contains in ortho-position to the —$NH_2$— group a group capable of taking part in the formation of metal complexes.

As monoazo-dyestuffs of the above general Formula I there are used, for example, 4-amino-4' - hydroxy-5'-methyl-1:1'-azobenzene-3:3'-dicarboxylic acid, 4-amino-4'-hydroxy-6'-methyl-1:1'-azobenzene-3:3'-dicarboxylic acid, 4-amino-2' - hydroxy - 5'-methoxy-1:1'-azobenzene-3:3'-dicarboxylic acid, and, preferably, 4-amino-4'-hydroxy-1:1'-azobenzene-3:3'-carboxylic acid.

As monoazo-dyestuffs of the above general Formula II there can be used, those which also correspond to the general Formula I and of which examples have already been given. Thus, valuable asymmetrical tetrakisazo-dyestuffs can be made by coupling with 5:5'-dihydroxy-2:2'-dinaphthylamine-7:7'-disulfonic acid two different diazotized amino-monoazo-dyestuffs each of which corresponds to the general Formula I. Valuable symmetrical dyestuffs are obtained by using two molecular proportions of the same diazotized amino-monoazo-dyestuff corresponding to Formula I.

Valuable asymmetrical tetrakisazo dyestuffs can also be made by using as starting materials one molecular proportion of an amino-monoazo-dyestuff which corresponds to the general Formula I and one molecular proportion of an amino-monoazo-dyestuff which corresponds to the general Formula II but does not correspond to the general Formula I. As amino-monoazo-dyestuffs of this latter kind there come into consideration, for example, those of the above Formula II wherein $R_2$ stands for an aromatic radical of the benzene series containing in ortho-position to the amino group an alkoxy group, preferably an alkoxy group containing only a few carbon atoms, such as an ethoxy or advantageously a methoxy group. The radical $R_2$ may carry either no substituents in addition to the groups —N=N—, —$NH_2$ and alkoxy, or it may contain, for example, in para-position to the alkoxy group further substituents, such as an alkyl group (for instance a methyl group) or a further alkoxy group (for instance an ethoxy or a methoxy group).

Thus, as monoazo-dyestuffs of the general Formula II there can be used, for example: 4-amino-2-methyl - 5 - methoxy - 4'-hydroxy-1:1'-azobenzene-3'-carboxylic acid; 4-amino-3-methoxy - 4'-hydroxy - 1:1'-azobenzene-3'-carboxylic acid; 4 - amino-2:5-dimethoxy-4'-hydroxy-1:1'-azobenzene-3'-carboxylic acid; 4-amino-2-ethoxy-5-methoxy-4' - hydroxy-1:1'-azobenzene-3'-carboxylic acid; 4-amino-2-methoxy - 5-ethoxy-4'-hydroxy-1:1'-azobenzene-3'-carboxylic acid; 4-amino - 2 - methyl-5-methoxy-4'-hydroxy-5'-methyl-1:1'-azobenzene-3'-carboxylic acid.

The monoazo-dyestuffs of Formula I can be made for example by coupling diazotized 2-nitro-5-amino-1-benzoic acid with an ortho-hydroxy-benzoic acid capable of coupling and reducing the nitro group of the so obtained nitro-azo-dyestuff into the amino group, for instance, by means of an alkali sulfide.

The monoazo-dyestuffs of the Formula II of which the radical R₂ contains in ortho-position to the amino-group an alkoxy group, can be prepared by coupling a diazotized amino-hydroxy-benzene-ortho-carboxylic acid with an amine of the benzene series containing an alkoxy group in ortho-position to the amino group. Some of these ortho-alkoxy-aminobenzenes, such as ortho-methoxy- or ortho-ethoxy-aminobenzene are coupled advantageously in the form of their ω-methane sulfonic acids.

The diazotizing of the amino-monoazo-dyestuffs of Formula I or II can be carried out advantageously by the so-called indirect method, viz. by dissolving the amino-azo-dyestuff in dilute alkali, adding the calculated amount of an alkali nitrite and then uniting this solution with a dilute solution containing an excess of mineral acid or a solution of sulfuric acid and naphthalene sulfonic acid.

In the present process coupling takes place with advantage in an alkaline medium. If symmetrical dyestuffs are to be made, the two mols of diazotized amino-monoazo-dyestuff may be united simultaneously with the solution rendered alkaline with an alkali hydroxide and containing one mol of 5:5'-dihydroxy-2:2'-dinaphthylamine-7:7'-disulfonic acid. In the manufacture of asymmetriacl tetrakisazo-dyestuffs, coupling of the two different diazotized amino-monoazo-dyestuffs with the 5:5'-dihydroxy-2:2'-dinaphthylamine-7:7'-disulfonic acid may be carried out simultaneously but is effected with advantage in two different stages. Asymmetrical tetrakisazo-dyestuffs from one molecular proportion of a diazotized amino-monoazo-dyestuff of Formula I and one molecular proportion of a diazotized amino-monoazo-dyestuff of Formula II, wherein the Radical R₂ contains an alkoxy group in ortho-position to the diazotized amino-group, are prepared advantageously by coupling first the diazotized amino-monoazo-dyestuff of Formula I with 5:5'-dihydroxy-2:2'-dinaphthylamine-7:7'-disulfonic acid in a rather weak alkaline medium, e. g. a medium alkaline with alkali carbonate, and then coupling the diazotized amino-monoazo-dyestuff of Formula II with the disazo-dyestuff thus obtained in a stronger alkaline medium, e. g. a medium alkaline with alkali hydroxide.

The dyestuffs obtained by the present process are new and correspond to the general formula

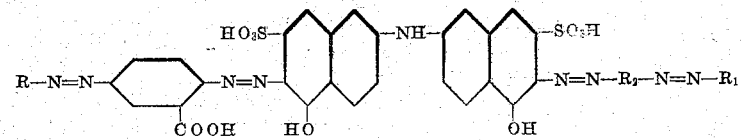

wherein R and R₁ each stands for an aromatic radical of the benzene series which is substituted by a hydroxyl and a carboxyl group in ortho-position to each other and R₂ stands for an aromatic radical of the benzene series in which the —N=N— groups are in para-position to each other and which contains a meta-position to the —N=N—R₁— radical a group capable of taking part in the formation of metal complexes, the radicals R, R₁, and R₂ being free from sulfonic acid groups.

These dyestuffs dye cellulose fibers such as cotton, linen or materials from regenerated cellulose, such as viscose or staple fiber chiefly reddish blue to greenish blue tints. Particularly valuable dyeings which are very fast to washing are obtained if the dyeings are after-treated with agents yielding copper.

The treatment of the cellulose fibers dyed with the dyestuffs of the above composition in usual manner from a neutral or feebly alkaline bath, for instance alkaline with sodium carbonate, with agents yielding copper may be carried out with ordinary copper salts, such as copper sulfate, in a neutral or feebly acetic acid bath, or preferably with copper compounds stable towards alkalies, such as are obtained for example by the reaction of ordinary copper salts with aliphatic hydroxy-carboxylic acids, such as tartaric acid, in an alkaline agent, for example an agent alkaline with alkali carbonate. Dyeing processes in which such coppering agents are used have been described for example in U. S. Patents 2,148,659 and 2,185,905. The treatment with the agents yielding copper may be effected in the dyebath or in a fresh bath.

Especially valuable dyeings can be obtained by working in accordance with the process in which dyeings or prints produced with the metal-free dyestuffs are after-treated with aqueous solutions which contain basic condensation products of formaldehyde with compounds containing in the molecule at least once the atomic grouping

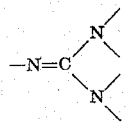

or with compounds capable of being easily transformed into compounds containing said atomic grouping as, for instance, cyanamide, and which solutions also contain water-soluble copper compounds, especially complex copper compounds. Such processes are described, for example, in British Patent No. 619,969.

As compared with the known dyestuffs of similar constitution which have been described in U. S. Patents 2,050,913 and 2,369,516 the new dyestuffs obtained according to the present process surprisingly yield coppered dyeings of considerably better fastness to washing.

The following examples illustrate the invention, the parts and percentages being by weight.

*Example 1*

30.1 parts of 4-amino-4'-hydroxy-1:1'-azobenzene-3:3'-dicarboxylic acid are dissolved with 27 parts of sodium hydroxide solution of 30 per cent. strength, in 200 parts of water and 7 parts of sodium nitrite are added. The clear solution is poured into a mixture of ice, 100 parts of sulfuric acid of 20 per cent. strength and 30 parts of naphthalene sulfonic acid at a temperature of 10–15° C. The whole is stirred for one hour and then the diazo paste is poured into a cooled solution of 23.1 parts of 2:2'-dinaphthylamine-5:5'-dihydroxy-7:7'-disulfonic acid in 200 parts of water. There are added drop by drop in the course of two hours 450 parts of sodium hydroxide solution of 10 per cent. strength, stirring is continued for another 2 hours and the precipitated dyestuff is filtered off and dried at a temperature of 100° C. It is a black powder of the formula

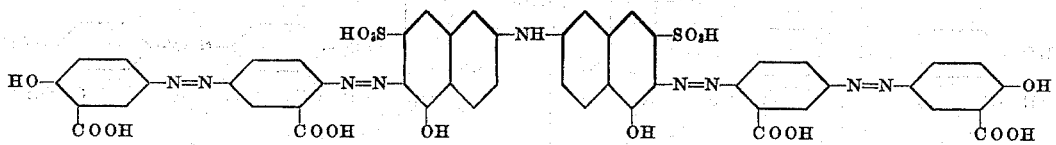

which dissolves in water with a violet coloration, in dilute sodium hydroxide solution with a reddish-blue coloration and in concentrated sulfuric acid with a green-blue coloration. Its after-coppered dyeing on cotton is a greenish blue of very good fastness to washing.

By using as diazotizing component 4-amino-4'-hydroxy - 5' - methyl-1:1'azobenzene-3:3'-dicarboxylic acid or 4-amino-4'-hydroxy-6'-methyl-1:1'-azobenzene-3:3'-dicarboxylic acid or 4-amino - 2' - hydroxy-5'-methyl-1:1'-azobenzene-3:3'-dicarboxylic acid similar dyestuffs are obtained.

Example 2

34.5 parts of the disodium salt of 4-amino-4'-hydroxy-1:1'-azobenzene-3:3'-dicarboxylic acid are dissolved in 300 parts of water and 7 parts of sodium nitrite are added. The solution is poured into a solution of 50 parts of hydrochloric acid of 30 per cent., strength in 50 parts of water which has been cooled to 10–15° C. The whole is stirred for two hours and then the yellowish brown colored diazo paste is poured into a solution of 46.1 parts of 5:5' - dihydroxy - 2:2' - dinaphthylamine-7:7'disulfonic acid in 300 parts of water and 40 parts of anhydrous sodium carbonate, which has been cooled to 5° C. When coupling is complete, the disazo-dyestuff is filtered off and dissolved in 230 parts of water with the addition of 15 parts of sodium hydroxide and the solution is cooled to 0° C. Into this solution is poured a diazo paste which has been made from 30.1 parts of 4-amino-2-methyl-5-methoxy-4'-hydroxy-1:1'-azobenzene-3'carboxylic acid in accordance with the above prescription for diazotizing 4 - amino-4'-hydroxy-1:1'-azobenzene-3:3'-dicarboxylic acid and the whole is stirred for 4 hours at 0–3° C. Then the excess of sodium hydroxide is neutralized with about 15 parts of hydrochloric acid of 30 per cent. strength until the reaction mixture has but a slightly alkaline reaction to phenolphthalein paper. The tetrakisazo dyestuff is precipitated with sodium chloride, filtered off and dried. It is a black powder which dissolves in water or dilute sodium hydroxide solution with a reddish blue coloration and in concentrated sulfuric acid with a green-blue coloration and which dyes cotton in accordance with the one- or two-bath after-coppering process reddish blue tints of very good fastness to washing.

Tetrakisazo-dyestuffs of similar properties are obtained by using as starting material instead of 4 - amino - 2-methyl-5-methoxy-4'-hydroxy-1:1'-azobenzene-3'-carboxylic acid one of the following compounds: 4-amino-3-methoxy-4'-hydroxy-1:1'-azobenzene-3'-carboxylic acid, 4-amino - 2:5 -dimethoxy-4'-hydroxy-1:1'-azobenzene - 3'-carboxylic acid, 4-amino-2-ethoxy-5-methoxy - 4' - hydroxyl -1:1'-azobenzene-3'-carboxylic acid, 4-amino-2-methoxy-5-ethoxy-4'-hydroxy-1:1'-azobenzene-3'-carboxylic acid, 4-amino - 2 - methyl - 5 - methoxy - 4'-hydroxy-5'-methyl-1:1'-azobenzene-3'-carboxylic acid, 4-amino - 4' - hydroxy-5'-methyl-1:1'-azobenzene-3:3'-dicarboxylic acid.

Example 3

100 parts of cotton are entered at 50° C. into a dyebath consisting of 4000 parts of water, 2 parts of anhydrous sodium carbonate and 1 part of the dyestuff obtainable as described in the first paragraph of Example 1, the temperature is raised to 90–95° C. in the course of 20 minutes, 30 parts of crystalline sodium sulfate are added, and dyeing is carried on for 30 minutes at 90–100° C. The whole is then allowed to cool to about 70° C. and the further treatment consists of one of the procedures described under (a), (b) and (c) below.

(a) The dyeing is rinsed with cold water and treated for ½ hour at 50° C. in a bath containing 4000 parts of water, 3 parts of crystalline copper sulfate, and 1 part of acetic acid. The goods are then rinsed and dried. A blue dyeing is obtained of good fastness to light and having very good properties of wet fastness.

(b) 4 parts of complex copper sodium tartrate of approximately neutral reaction are added to the dyebath cooled to about 70° C., coppering is carried on for ½ hour at 80° C., and the dyeing is rinsed with cold water. If desired the dyeing may be soaped by after-treatment for ½ hour in a bath containing, per liter, 5 grams of Marseilles soap and 2 grams of anhydrous sodium carbonate. A blue dyeing is obtained which has a good fastness to light and very good properties of wet fastness.

(c) The dyeing is rinsed with cold water, and then after-treated for ½ hour at 20° C. in a solution, which has been prepared by dissolving 4.5 parts of the water-soluble condensation product of dicyandiamide and formaldehyde, 1.5 parts of copper acetate and 6 parts of concentrated aqueous ammonia solution in 3000 parts of water and adding 2 parts of anhydrous sodium carbonate to the solution containing cupric tetramine acetate. The goods are then rinsed and dried. There is obtained a blue dyeing which is distinguished by good fastness to light and very good properties of wet fastness.

What we claim is:

1. A tetrakisazo-dyestuff corresponding to the general formula

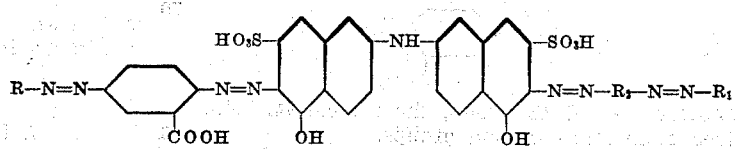

wherein R and R₁ each stands for an aromatic radical of the benzene series which is substituted

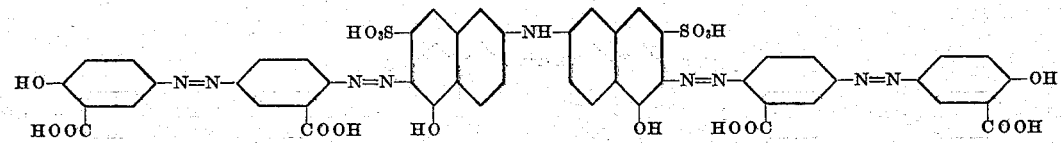

by a hydroxyl and a carboxyl group in ortho-position to each other and R₂ stands for a mononuclear aryl radical in which the —N=N—

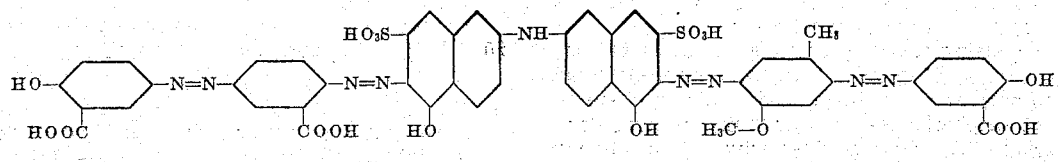

groups are in para-position to each other and which contains in meta-position to the

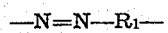

—N=N—R₁—

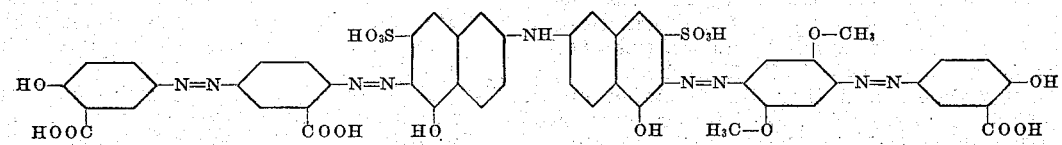

radical a substituent selected from the group consisting of —COOH, —OCH₃ and —OC₂H₅,

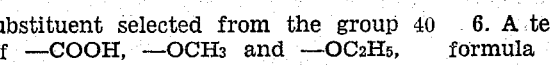

the radicals R, R₁, and R₂ being free from sulfonic acid groups.

2. A tetrakisazo dyestuff corresponding to the general formula

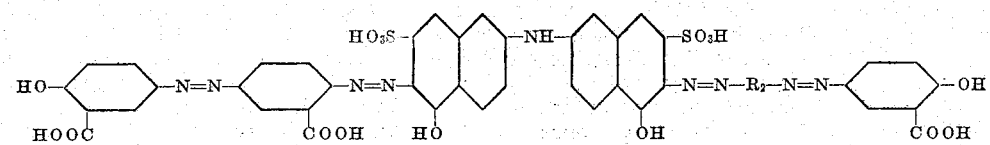

in which R₂ stands for a mononuclear aryl radical in which the —N=N— groups are in para-position to each other and which contains in meta-position to the

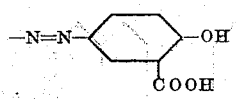

radical a —COOH group, the radical R₂ being free from sulfonic acid groups.

3. The tetrakisazo-dyestuff corresponding to the formula

4. The tetrakisazo-dyestuff corresponding to the formula

5. The tetrakisazo-dyestuff corresponding to the formula

6. A tetrakisazo dyestuff corresponding to the formula

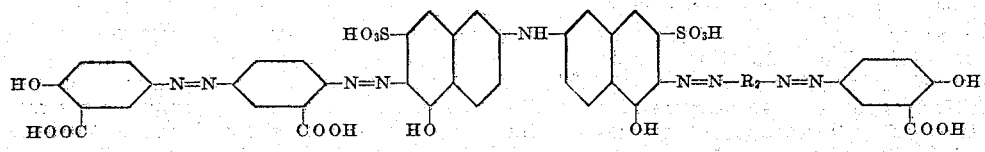

in which R₂ stands for a mononuclear aryl radical in which the —N=N— groups are in para-position to each other and which contains in meta-position to the

—N=N—⌬—OH
       |
       COOH radical an —OCH₃ group, the radical R₂ being free from sulfonic acid groups.

MAX SCHMID.
EDUARD MOSER.

(References on following page)

REFERENCES CITED

The following references are of record in the file of this patent:

UNITED STATES PATENTS

| Number | Name | Date |
|---|---|---|
| 1,783,083 | Gubler et al. | Nov. 25, 1930 |
| 2,050,913 | Anderau | Aug. 11, 1936 |
| 2,387,659 | Kaiser | Oct. 30, 1945 |
| 2,396,659 | Kaiser | Mar. 19, 1946 |
| 2,411,646 | Anderau | Nov. 26, 1946 |

FOREIGN PATENTS

| Number | Country | Date |
|---|---|---|
| 373,757 | Italy | Aug. 3, 1939 |

OTHER REFERENCES

Groggins, "Unit Processes in Organic Syntheses," 1947, page 156.